United States Patent
Sugiyama et al.

(10) Patent No.: US 9,932,069 B2
(45) Date of Patent: Apr. 3, 2018

(54) VEHICLE STEERING SYSTEM

(71) Applicant: JTEKT CORPORATION, Osaka-shi, Osaka (JP)

(72) Inventors: Toyoki Sugiyama, Kitakatsuragi-gun (JP); Yasuyuki Yoshii, Tenri (JP)

(73) Assignee: JTEKT CORPORATION, Osaka (JP)

( * ) Notice: Subject to any disclaimer, the term of this patent is extended or adjusted under 35 U.S.C. 154(b) by 1076 days.

(21) Appl. No.: 13/705,688

(22) Filed: Dec. 5, 2012

(65) Prior Publication Data

US 2013/0158806 A1    Jun. 20, 2013

(30) Foreign Application Priority Data

Dec. 14, 2011  (JP) ................. 2011-273472

(51) Int. Cl.
- B62D 6/02 (2006.01)
- B62D 5/00 (2006.01)

(52) U.S. Cl.
CPC ............. *B62D 6/02* (2013.01); *B62D 5/001* (2013.01)

(58) Field of Classification Search
CPC .... H02P 7/00; B62D 5/04; B62D 6/00; B60T 8/60; G05B 13/02
USPC .............. 701/41, 42; 700/30; 180/443, 446; 318/434; 303/155
See application file for complete search history.

(56) References Cited

U.S. PATENT DOCUMENTS

| | | | |
|---|---|---|---|
| 2003/0106738 A1* | 6/2003 | Yoneda et al. | 180/446 |
| 2003/0107339 A1* | 6/2003 | Shimizu et al. | 318/434 |
| 2003/0114970 A1 | 6/2003 | Hara | |
| 2004/0059442 A1* | 3/2004 | Birkelbach et al. | 700/30 |
| 2004/0148079 A1* | 7/2004 | Sugiyama et al. | 701/41 |
| 2004/0162655 A1* | 8/2004 | Patankar | 701/41 |
| 2004/0186641 A1* | 9/2004 | Hironaka et al. | 701/42 |

(Continued)

FOREIGN PATENT DOCUMENTS

| | | |
|---|---|---|
| EP | 1 900 605 A2 | 3/2008 |
| JP | H08-85468 A | 4/1996 |

(Continued)

OTHER PUBLICATIONS

Extended European Search Report issued in European Application No. 12196184.1 dated Feb. 6, 2014.

(Continued)

*Primary Examiner* — Anne M Antonucci
*Assistant Examiner* — Sanjeev Malhotra
(74) *Attorney, Agent, or Firm* — Oliff PLC

(57) ABSTRACT

When a vehicle is quickly steered while the vehicle is travelling at an extremely low speed, a load on an in-vehicle power supply is reduced without deteriorating a steering feeling by reducing a motor driving current. A steering speed is compared with a threshold. When the steering speed is lower than the threshold, the process proceeds to step S6. In step S6, a voltage value of a battery power supply, which is used as a prescribed value, is set as a limit voltage in order to reduce a motor consumption current. When the steering speed is higher than the threshold, a value "V0/n" lower than the prescribed value is set as the limit voltage to reduce a consumption current when the steering wheel is steered without driving. "n" is "delay adjustment parameter", and is a real number that exceeds 1.

3 Claims, 4 Drawing Sheets

(56) References Cited

U.S. PATENT DOCUMENTS

2004/0222035 A1* 11/2004 Yoneda et al. ............... 180/443
2007/0228823 A1* 10/2007 Kokubo et al. .............. 303/155

FOREIGN PATENT DOCUMENTS

| JP | A-2003-002224 | 1/2003 |
| JP | A-2008-290664 | 12/2008 |

OTHER PUBLICATIONS

Sep. 10, 2015 Office Action issued in Japanese Patent Application No. 2011-273472.

* cited by examiner

VEHICLE STEERING SYSTEM

INCORPORATION BY REFERENCE/RELATED APPLICATION

This application claims priority to Japanese Patent Application No. 2011-273472 filed on Dec. 14, 2011 the disclosure of which, including the specification, drawings and abstract, is incorporated herein by reference in its entirety.

BACKGROUND OF THE INVENTION

Field of the Invention

The invention relates to a vehicle steering system.

Discussion of Background

An electric power steering system, which is an example of a vehicle steering system, is a system that executes appropriate steering assist control in the following manner. A steering torque that is applied to a steering wheel (steering member) and a vehicle speed are detected, a steering torque signal and a vehicle speed signal are transmitted to an EPS electric motor control circuit, and the EPS electric motor control circuit supplies a driving current, which corresponds to the steering torque and the vehicle speed that are obtained from these signals, to a steering assist electric motor. A steering gear mechanism of this system includes a pinion shaft and a steering rack shaft. The steering assist electric motor is coupled to the pinion shaft. The steering rack shaft serves as a steered shaft that is in mesh with the pinion shaft and extends in the lateral direction of a vehicle. Note that there is a rack coaxial-type steering assist electric motor in which a steering assist electric motor is provided coaxially with a steering rack shaft. On the other hand, a steer-by-wire system (SBW) is a system in which a steering column mechanism on the steering side and a steering gear mechanism on the steered side are mechanically separated from each other, and which performs steering of a vehicle such that the steered angle of wheels is changed in accordance with the rotation of a steering member via an electric signal. A steering system electric motor is arranged in the steering gear mechanism, and a steered shaft that is coupled to the wheels is actuated by the steering system electric motor. An active front steering system (AFS) is a system that optimally controls the steered angle of wheels by using a variable gear ratio mechanism that is able to flexibly change the correlation between an operation amount of a steering wheel and the steered angle of the wheels. In each of the systems, knuckle arms are pivotably coupled respectively to a pair of end portions of the steering rack shaft via tie rods. A rightward force and a leftward force that are applied to the steering rack shaft each are referred to as "rack axial force". When the steering member is steered or the steering system electric motor is rotated, a rack axial force is generated. As a result, the knuckle arms are pivoted on the basis of the generated rack axial force, and the steered wheels are steered.

For example, a steer-by-wire system described in Japanese Patent Application Publication No. 2003-2224 (JP 2003-2224 A) is a system in which a steering column mechanism on the steering side and a steering gear mechanism on the steered side are mechanically separated from each other, and which performs steering of a vehicle such that the steered angle of wheels is changed in accordance with the rotation of a steering member via an electric signal. A steering system electric motor is arranged in the steering gear mechanism, and a steered shaft that is coupled to the wheels is actuated by the steering system electric motor.

A variable transmission ratio steering system is a system that optimally controls the steered angle of wheels by using a variable transmission ratio mechanism that is able to change the correlation between an operation amount of a steering wheel and the steered angle of the wheels. In each of the systems, knuckle arms are pivotably coupled respectively to a pair of end portions of the steering rack shaft via tie rods. A rightward force and a leftward force that are applied to the steering rack shaft each are referred to as "rack axial force". When the steering member is steered or the steering system electric motor is rotated, a rack axial force is generated. As a result, the knuckle arms are pivoted on the basis of the generated rack axial force, and the steered wheels are steered.

When the vehicle is stopped or when the vehicle is travelling at an extremely low speed, current that is supplied to the above-described steering assist electric motor or steering system electric motor is controlled in the same manner as that when the vehicle is travelling at normal speeds. That is, when the vehicle is stopped or when the vehicle is travelling at an extremely low speed, the steering torque is positively correlated with a rotation speed (steering speed) of the steering member. Therefore, when a steering operation is performed while the vehicle is stopped or the vehicle is travelling at an extremely low speed, a driving current corresponding to the steering speed flows through the steering assist electric motor or the steering system electric motor, and electric power is thus consumed.

FIG. 4 is a graph obtained by measuring the correlation, for each steering speed, between the steering angle and a driving current of a steering assist electric motor when a steering member is rotated from −720 degrees to +720 degrees while a vehicle is stopped in a conventional electric power steering system. The curve (1) shows data when the steering speed is 653 degrees per second (653°/sec). The curve (2) shows data when the steering speed is 332 degrees per second (332°/sec). The curve (3) shows data when the steering speed is 143 degrees per second (143°/sec). The curve (4) shows data when the steering speed is 27 degrees per second (27°/sec). The graph shows that, even if the rotation amount of the steering member is the same, the driving current becomes higher when the steering member is rotated quickly than when the steering member is rotated slowly.

In recent years, electrification of automobiles including electric vehicles and hybrid vehicles has been proceeding, and an electrical load on an in-vehicle power supply tends to increase. Therefore, a vehicle steering system is also required to consume less amounts of power.

SUMMARY OF THE INVENTION

The invention provides a vehicle steering system that is able to reduce an electrical load on an in-vehicle power supply without deteriorating a steering feeling, by reducing a driving current of a motor when a vehicle is steered while the vehicle is stopped or travelling at an extremely low speed.

According to a feature of an example of the invention, a vehicle steering system in which an electric motor for steering a wheel is mounted includes: a limit value setting unit that determines whether a vehicle is stopped or travelling at an extremely low speed, and that, when it is determined that the vehicle is stopped or travelling at an extremely low speed, outputs a limit value for imposing limitation on electric power that is consumed by the electric motor on a condition that a steering speed at which a steering member is steered is higher than a predetermined threshold; and a command voltage control unit that outputs a control value for controlling the electric motor by using the limit value provided from the limit value setting unit With this configuration, when the vehicle is stopped or travelling at an extremely low speed and the steering speed of the steering member is higher than or equal to the predetermined threshold, limitation is imposed on the control value for controlling the electric motor. Therefore, when so-called steering without driving is performed or the vehicle is travelling at an extremely low speed, it is possible to obtain a natural steering feeling, and it is possible to prevent the electric motor from consuming an excess amount of electric power. Thus, it is possible to achieve power saving.

When the electric motor is a motor that is controlled through pulse width modulation, the control value for controlling the electric motor may be a voltage value that is used to perform the pulse width modulation. As the voltage value increases, a pulse width increases, and excessively high current flows through the electric motor. Therefore, by imposing limitation on the voltage value, it is possible to limit current that flows through the electric motor.

The electric motor may be a brushless motor or a brushed motor.

The predetermined threshold is, for example, 360 degrees per second. This is because, when the steering member is steered at such a high speed, limitation should be imposed such that the electric motor does not consume an excess amount of electric power.

The invention may be applied to not only a steer-by-wire system but also an electric power steering system that appropriately executes steering assist control using a steering assist electric motor or a vehicle in which a variable transmission ratio steering system is employed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
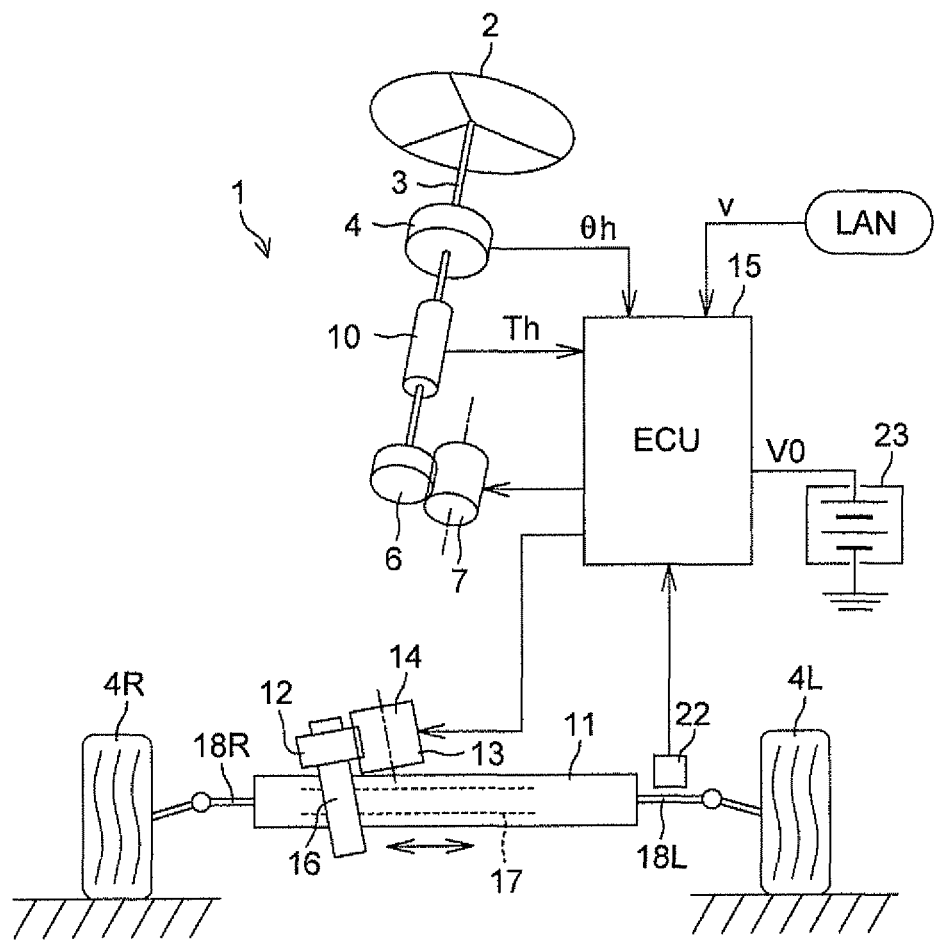
FIG. 1 is a view showing the overall configuration of a steer-by-wire vehicle steering system.

FIG. 1 is a view showing the overall configuration of a vehicle steering system 1. The vehicle steering system 1 includes a shaft 3, a steering angle sensor 4, a steering torque sensor 10, and a reaction motor 7, A steering member 2 is coupled to the shaft 3. The steering angle sensor 4 is arranged on the shaft 3, and detects a steering angle θh of the steering member 2. The steering torque sensor 10 detects a steering torque Th of the steering member 2. The reaction motor 7 applies a steering reaction force to the steering member 2 via a gear 6. The steering torque sensor 10 detects the steering torque Th by detecting a torsional angle of a torsion bar arranged at a middle portion of the shaft 3. The steering angle sensor 4 detects a rotation angle of the shaft 3 by detecting a magnetism of a multi-polar magnet, which is attached to the outer periphery of the shaft 3, with the use of a Hall sensor. In the present embodiment, the steering angle sensor 4 is used to detect a rotation angle from the neutral position of the steering member 2 in each of the forward and reverse directions of the steering member 2. The steering angle sensor 4 outputs an angle of rotation to the right from the neutral position as a positive value, and outputs an angle of rotation to the left from the neutral position as a negative value. The reaction motor 7 is provided in parallel with the shaft 3, and is a direct-current motor that rotates the shaft 3 at a predetermined gear ratio that is determined by the gear 6. The reaction motor 7 may be arranged coaxially with the shaft 3 (coaxially with a steering column) instead of being arranged in parallel with the shaft 3.

In this specification, a mechanism including members from the steering member 2 to the gear 6 and mainly formed of the shaft 3 is referred to as "column mechanism", and a mechanism that generates a rack axial force, that causes knuckle arms to pivot on the basis of the generated rack axial force, and that steers steered wheels is referred to as "steering gear mechanism". The steering gear mechanism includes a rack shaft 17, a rack support member 11, a pinion 16 and a steering system electric motor 14. The rack shaft 17 serves as a steered shaft, and extends in the lateral direction of a vehicle. The rack support member 11 is supported on a vehicle body, and supports the rack shaft 17 such that the rack shaft 17 is movable. The pinion 16 is in mesh with the rack shaft 17. The steering system electric motor 14 rotates the pinion 16 via a worm gear 12.

The rotation motion of the steering system electric motor 14 is converted into a reciprocating motion of the rack shaft 17, which is accommodated in the rack support member 11, via the pinion 16. The reciprocating motion is transmitted to tires 4R, 4L via tie rods 18R, 18L that are coupled respectively to a pair of end portions of the rack shaft 17. In this way, the tires 4R, 4L are steered. A rack shaft displacement sensor 22 is provided at one of the end portions of the rack shaft 17. Although the type of the sensor is not limited, the sensor may be an optical displacement sensor that optically reads a value of a scale provided on the rack shaft. The rack shaft displacement sensor 22 functions as a steered angle sensor that detects a steered position (in this specification, referred to as "steered angle") of the tires 4R, 4L by utilizing the fact that a displacement position of the rack shaft 17 corresponds to the steered angle of the tires 4R, 4L.

In FIG. 1, the steering system electric motor 14 is attached to the rack support member 11. Alternatively, the steering system electric motor 14 may be a rack coaxial-type motor that is incorporated in the rack support member 11 and that includes a motion conversion mechanism, such as a ball screw mechanism, which converts the rotation motion of a motor output shaft into a linear motion of the rack shaft 17. Furthermore, the vehicle steering system 1 includes an ECU 15 in which a computer is incorporated. The ECU 15 is connected to a power supply 23, and is supplied with, for example, electric power for driving a driver circuit 35 from the power supply 23.

The ECU 15 receives, as data, the steering angle θh detected by the steering angle sensor 4, the steering torque Th detected by the steering torque sensor 10, a vehicle speed v that is acquired via an in-vehicle LAN, and a displacement of the rack shaft 17 detected by the rack shaft displacement sensor 22. The ECU 15 is supplied with electric power from the power supply 23, and executes drive control of the reaction motor 7 using the electric power so that a reaction force is applied to the steering member 2. In addition, the ECU 15 executes drive control of the steering system electric motor 14 so that the tires 4R, 4L are steered via the tie rods 18R, 18L coupled to the respective end portions of the rack shaft 17. Hereinafter, a voltage value of the power supply 23 is denoted by "V0".

The ECU 15 may be configured such that a reaction force system ECU portion that executes drive control of the reaction motor 7 and a steered system ECU portion that executes drive control of the steering system electric motor 14 are formed of separate circuits and the circuits are connected to each other via an in-vehicle LAN to allow data communication and data processing.

Figure 2:
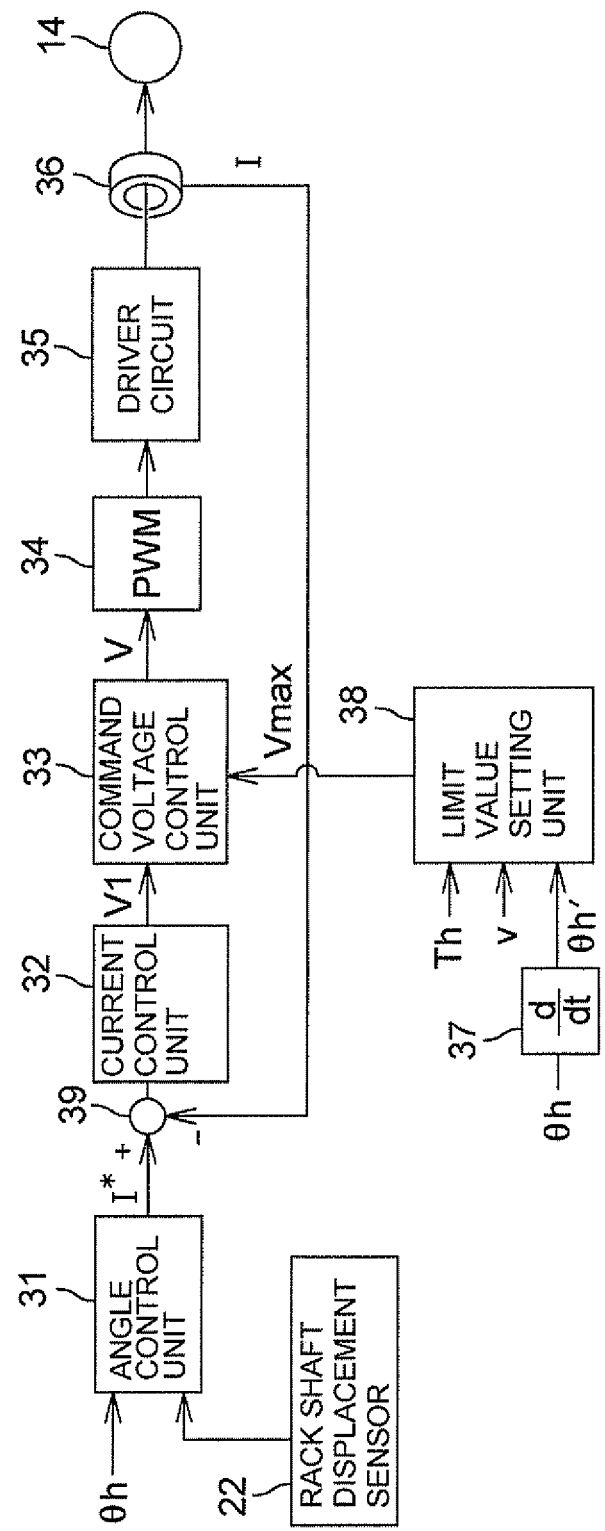
FIG. 2 is a functional block diagram that shows functions of various units of an ECU that executes control for limiting electric power that is extracted from a power supply when a driver rapidly steers a steering member.

FIG. 2 is a functional block diagram that shows functions of units of the ECU 15 that executes control for limiting electric power that is extracted from the power supply 23 when a driver rapidly steers the steering member 2. The steering angle θh detected by the steering angle sensor 4 is input into an angle control unit 31 that executes PI control. The steered angle (which is obtained by converting the displacement of the rack shaft 17 into an angle) of the tires 4R, 4L, which is detected by the rack shaft displacement sensor 22, is input into the angle control unit 31. Then, PI control is executed by the angle control unit 31 on the basis of an angular difference between the steering angle θh and the steered angle such that the steered angle of the tires 4R, 4L corresponds to the steering angle θh.

The angle control unit 31 supplies a target current value I* for rotating the steering system electric motor 14 to a current control unit 32, while a driving current value I, which is a value of a driving current flowing through the steering system electric motor 14 and which is detected by a current sensor 36, is fed back to the current control unit 32 via a subtracted 39. Then, PI control based on a difference between the target current value I* and the driving current value I is executed by the current control unit 32. The current sensor 36 may be a current sensor that is formed of a ring-shaped magnetic body through which an electric wire is passed as shown in FIG. 2 and that detects a voltage that is generated in proportion to a current, or may be a current sensor that is formed of a resistor through which an electric wire is passed and that detects a voltage that is generated at both ends of the resistor.

A command voltage value V1 of driving current, which is output from the current control unit 32, is input into a command voltage control unit 33 as will be described later. Furthermore, a maximum voltage Vmax is input from a limit value setting unit 38 (descried later) into the command voltage control unit 33, and a voltage limitation is imposed by the command voltage control unit 33 using the maximum voltage Vmax. A command voltage value V obtained through the voltage limitation is supplied to a PWM circuit 34. The command voltage value V is converted into a pulse-width-modulated rectangular PWM signal by the PWM circuit 34 here, and is then input into the driver circuit 35. The driver circuit 35 generates a driving current on the basis of the PWM signal, and rotates the steering system electric motor 14.

According to the embodiment of the invention, in order to limit electric power that is extracted from the power supply 23 when the driver rapidly steers the steering member 2, a voltage limitation is imposed on the command voltage value V1 of driving current by the command voltage control unit 33. Therefore, the limit value setting unit 38 that provides voltage limitation information to the command voltage control unit 33 is provided. As shown in FIG. 2, the steering torque Th detected by the steering torque sensor 10 and the vehicle speed v acquired via the in-vehicle LAN are input into the limit value setting unit 38, and, in order to determine whether rapid steering of the steering member 2 is performed, the steering angle θh detected by the steering angle sensor 4 is converted into a steering speed d(θh)/dt (hereinafter, denoted by "θh'") by a differentiating circuit 37 and is then input into the limit value setting unit 38.

Figure 3:
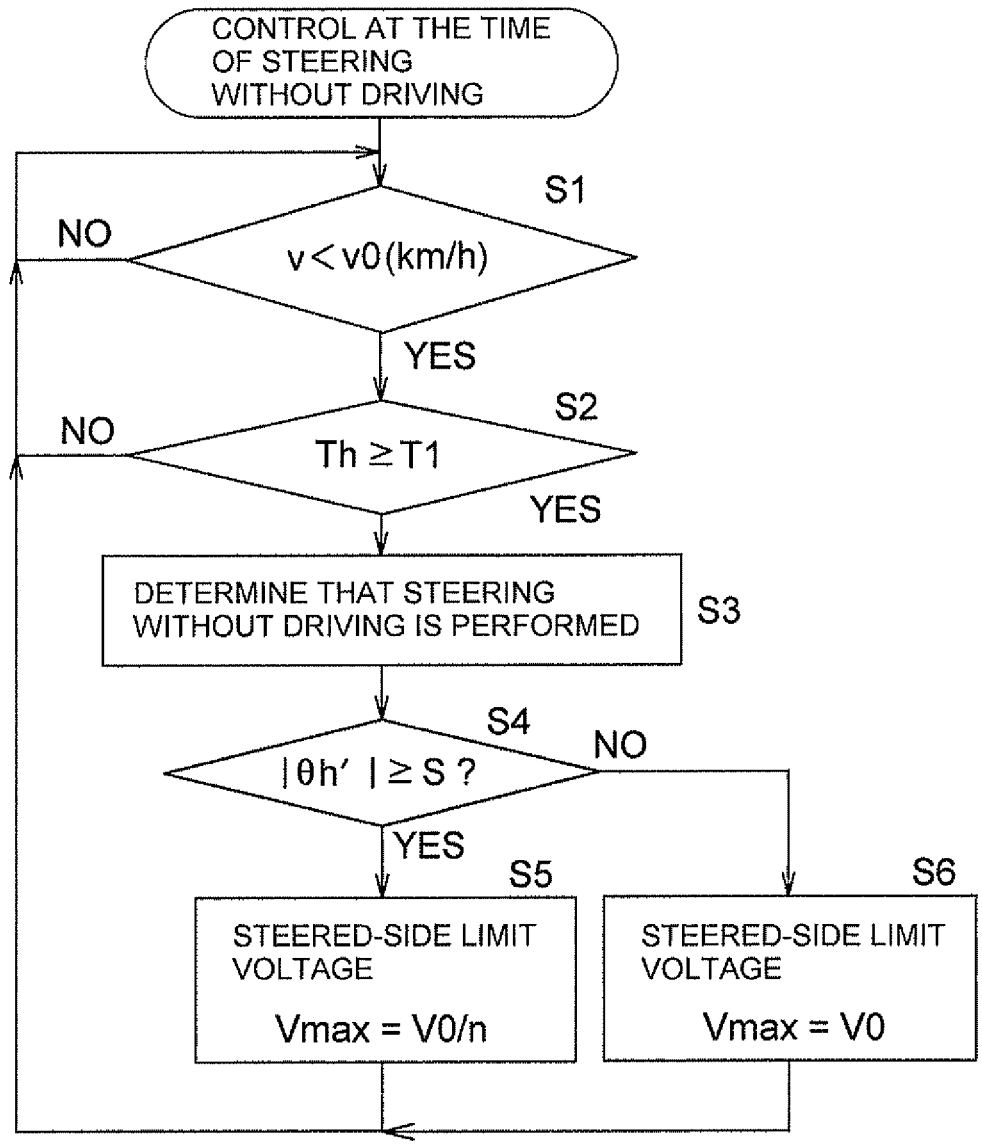
FIG. 3 is a flowchart that shows a control procedure for providing voltage limitation information to a command voltage control unit, which is executed by a limit value setting unit.
Figure 4:
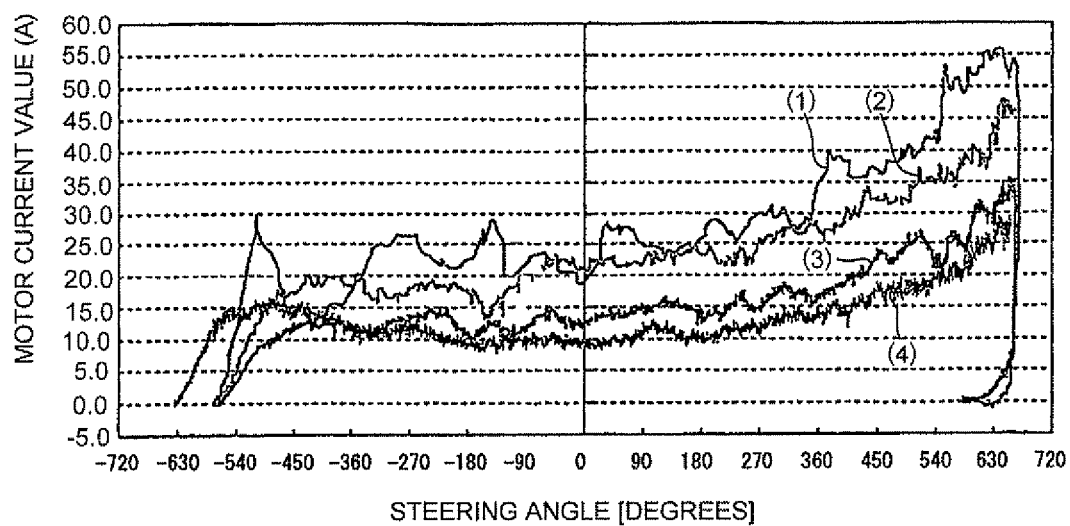
FIG. 4 is a graph that is obtained by measuring the correlation, for each steering speed, between the steering angle and a driving current of a steering assist electric motor when a steering member is rotated from −720 degrees to +720 degrees while a vehicle is stopped.

Hereinafter, a control procedure for providing voltage limitation information to the command voltage control unit 33, which is executed by the limit value setting unit 38, will be described with reference to the flowchart (FIG. 3). First, in order to determine whether the vehicle is stopped or travelling at an extremely low speed for, for example, placing the vehicle into a garage, the limit value setting unit 38 compares the vehicle speed v with a threshold v0, and determines whether the vehicle is stopped or travelling at an extremely low speed (step S1). Subsequently, it is determined whether the steering torque Th detected by the steering torque sensor 10 is higher than or equal to a threshold T1 (step S2). This process is executed in order to determine whether control for reducing a consumption current is unnecessary. This is because, when the steering torque Th is lower than the threshold T1, a consumption current that is supplied from the driver circuit 35 to the steering system electric motor 14 is small and therefore the control for reducing a consumption current is not required. Therefore, the threshold T1 is set in view of determining whether it is necessary to reduce a consumption current that is supplied from the driver circuit 35 to the steering system electric motor 14.

When an affirmative determination is made in step S2, it is determined that the driver is performing steering without driving, that is, the driver is rotating the steering member by a large angle while the vehicle is not travelling (step S3). Subsequently, the absolute value of the steering speed θh' is compared with a threshold s (s>0) (step S4). The threshold s is set in order to determine whether it is unnecessary to execute control for reducing a consumption current. This is because, when the absolute value of the steering speed θh' is smaller than the threshold s, a consumption current that is supplied from the driver circuit 35 to the steering system electric motor 14 is small and therefore the control for reducing a consumption current is not required. Therefore, the threshold s is set in view of determining whether it is necessary to reduce a consumption current that is supplied from the driver circuit 35 to the steering system electric motor 14. The threshold s is, for example, 360 degrees per second in rotation speed of the steering member 2.

If the absolute value of the steering speed θh' is smaller than the threshold s, the process proceeds to step S6. In step S6, the voltage value V0 of the power supply 23, which is used as a prescribed value, is set as the limit voltage Vmax in order to reduce a consumption current. If the absolute value of the steering speed θh' is larger than or equal to the threshold s, a value lower than the prescribed value V0 is set as the limit voltage Vmax in order to reduce a consumption current at the time when the driver is performing steering without driving. In the present embodiment, the value is denoted by "V0/n". Here, "n" is referred to as "delay adjustment parameter", and is a real number that exceeds 1. For example, when n=2, the limit voltage Vmax is V0/2 that is half the prescribed value V0.

As described above, when the absolute value of the steering speed θh' is larger than the threshold s, a value smaller than the normally set value V0 is set as the limit voltage Vmax, and the thus set limit voltage Vmax is provided to the command voltage control unit 33. As a result, the command voltage control unit 33 is able to output the command voltage value V, which is obtained through voltage limitation imposed using the received limit voltage Vmax, to the PWM circuit 34. In the PWM circuit 34, a duty ratio is limited using the limit voltage Vmax when a pulse-width-modulated PWM signal is generated. Therefore, the driver circuit 35 is able to prevent a large driving current from being abruptly generated when the driving current is generated on the basis of the PWM signal. As a result, when the driver rapidly performs steering without driving, it is possible to suppress consumption of current from the power supply 23, and it is possible to steer the steered wheels at an optimal steering speed.

The embodiment of the invention is described above. However, the invention is not limited to the above embodiment. In the above-described embodiment, the description is provided on the steer-by-wire system in which the steering column mechanism on the steering side and the steering gear mechanism on the steered side are mechanically separated from each other. Alternatively, the invention in which current that is supplied to the steering system electric motor 14 is limited may also be applied to an electric power steering system that assists a steering operation on the basis of, for example, a steering torque that is applied to a steering wheel (steering member). In this case, if the steering speed is high when the driver is performing steering without driving, current that is supplied to a steering assist electric motor is limited. In addition, the invention may also be applied by limiting current that is supplied to an electric motor that is installed in a variable transmission ratio mechanism of a variable transmission ratio steering system.

What is claimed is:

1. A vehicle steering system in which an electric motor for steering a wheel is mounted, the vehicle steering system comprising:
   a limit value setting unit that (i) determines whether a vehicle is stopped or travelling at an extremely low speed, and, when it is determined that the vehicle is stopped or travelling at the extremely low, speed, (ii) outputs a limit value for imposing limitation on electric power that is consumed by the electric motor on a condition that a steering speed at which a steering member is steered is higher than a predetermined threshold; and
   a command voltage control unit that outputs a control value for controlling the electric motor by using the limit value provided from the limit value setting unit.

2. The vehicle steering system according to claim 1, wherein the electric motor is a motor that is controlled through pulse width modulation, and the control value for controlling the electric motor is a voltage value that is used to perform the pulse width modulation.

3. The vehicle steering system according to claim 1, wherein the predetermined threshold is 360 degrees per second in steering speed of the steering member.

* * * * *